June 11, 1968  W. R. SOUCY  3,387,624

AUTOMATIC VALVULAR CLOSURE

Filed June 20, 1962  3 Sheets-Sheet 1

INVENTOR

Wilfred R. Soucy

June 11, 1968 W. R. SOUCY 3,387,624
AUTOMATIC VALVULAR CLOSURE

Filed June 20, 1962 3 Sheets-Sheet 3

INVENTOR
Wilfred R. Soucy

United States Patent Office 3,387,624
Patented June 11, 1968

3,387,624
AUTOMATIC VALVULAR CLOSURE
Wilfred Roland Soucy, Loudonville, N.Y.
(P.O. Box 1002, Troy, N.Y. 12181)
Continuation-in-part of application Ser. No. 855,488,
Nov. 16, 1959. This application June 20, 1962, Ser.
No. 206,118
3 Claims. (Cl. 137—525.1)

The present application is a continuation-in-part of my co-pending application Ser. No. 855,488, filed Nov. 16, 1959, now abandoned entitled Automatic Valvular Closure, which was a continuation-in-part of my earlier application Ser. No. 723,624, filed Mar. 20, 1958, now abandoned with which said application, Ser. No. 855,-488 was co-pending.

This invention relates to valvular closures of the type from which viscous and non-viscous fluids and powders can be extruded.

This invention is directed to the novel use of an elastically elongatable member in the form of a tie to allow opening, automatically achieve closing and/or yieldably maintain closure. Unlike prior closing devices, this member imparts new and valuable versatility to the design of automatic valvular closures, as herein disclosed, for many new applications and gives birth to new embodiments that operate in a much more facile manner and are more economical of construction. In addition, such a member introduces or allows the use of new and more efficient materials for the various components.

Many in the field have heretofore suggested devices to accomplish similar purposes but these were of specialized nature, inefficient and high in cost. Such devices also lacked serviceability and, of prime importance, did not provide an effective seal. Moreover, the outflow from these has always been discharged in an unsatisfactory shape and often is difficult to control. For these reasons and others few have achieved much, if any, commercial success.

The purposes of this invention are, therefore, to bring forth an automatic valvular closure which overcomes the foregoing disadvantages, is economically feasible, and obviates many of the technical complexities and limitations of the present art.

The closing means embodied by this invention features a new mode of operation accomplishing much greater structural simplicity coupled with more versatile arrangement and interrelation of the cooperating elements. For opening, the material of the closing means elongates or stretches and it automatically achieves closure by elastically returning to its original dimensions. Thus any practicable degree of closing pressure is easily obtained by merely introducing the corresponding amount of tensile prestress or pull therein.

Prior to this invention, one of the major problems had been the development of an automatic valvular closure for handling non-viscous volatile liquids, such as thin petroleums and perfumes, which require a complete seal to prevent evaporation during storage. Such a closure calls for a body design with mating mouth elements that fully seat with repeated use, and an effective closing means that can be independently and accurately tensioned for positive closing action. These desires are readily accomplished through the use of the aforementioned elastically elongatable member, which is adaptable to innumerable designs of mouth elements providing greater utility, complete sealing and ease of operation.

In the field of packaging, the attributes of an elastically elongatable closing means in the form of a tie enable the design of a handy disposable fitment useable on plastic squeeze containers, soft-metal collapsible tubes, etc., for dispensing fluids with ease and accuracy of placement. Such a dispensing device is usually actuated by applying a squeezing action to the container, thereby exerting a pressure on the contents therein. The pressure is transmitted by the contents to a mouth element, causing the closing means to yield and thus allow the mouth element to open. The use of an elastically elongatable member in the form of a tie for the closing means provides a low cost dispensing device which automatically closes when the squeezing action is removed, which is easily manipulated without skill and which incorporates all of the aforementioned advantages and purposes of this invention.

The new mode of operation of the closing means also allows the use of new and more efficient materials therefor, some of which are capable of being stretched many times their unyielding length. Heretofore, the independent closing means of prior devices were incapable of yielding sufficiently to permit the mouth elements to fully open; thus the automatic valvular closures utilizing such means had comparatively small discharge capacities for their size. The closing means embodied by this invention now allows larger apertures for vastly greater discharge capacities, is adaptable to any practicable degree of opening pressure and, above such pressure, provides easy control throughout the flow range.

The adaptability of elastically elongatable closing means as a tie and its inherent simplicity offer complete freedom to the design of the closure body and the mouth elements thereof. Through its use apertures of many different configurations may be created for obtaining extrusions of various appealing and useful shapes as well as permitting the body and mouth elements to be made of a material most suitable for the purpose. These features also make possible the manufacture of the embodiments herein disclosed by automation.

In this application the elastic member is considered and is frequently referred to as a tie which is elastically elongatable. The term "elongatable" is intended to mean ability to lengthen in the spatial sense directly by tensile deformation, of the tie material, substantially throughout the effective working area of, and at said area, in the direction of lines intersecting the plane of, an imaginary cross-section of the tie—all as understood in that branch of mechanics which treats of the resistance of materials.

For a fuller understanding of the nature and objects of the invention reference should be had to the following detailed description taken in connection with the accompanying drawings, in which.

Figure 1:
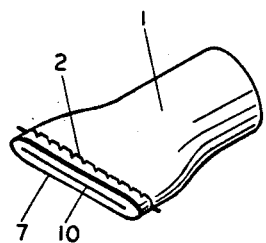
FIGURE 1 is a perspective view of one of said closures embodied by the invention.
Figure 4:
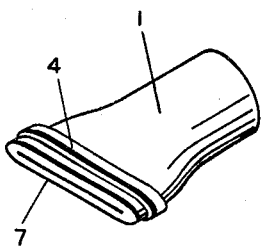
FIGURE 4 is a perspective view of another of said closures embodied by the invention.
Figure 6:
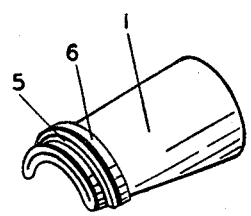
Figure 7:
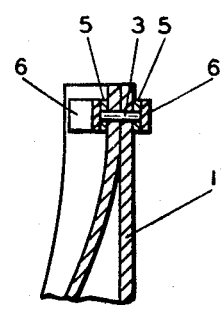
Figure 9:
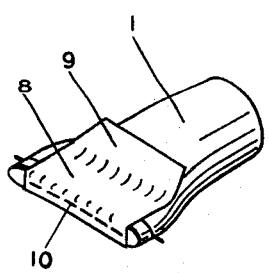
Figure 8:
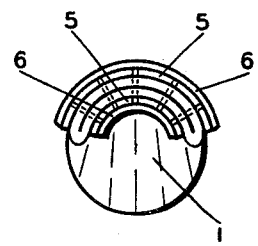
Figure 10:
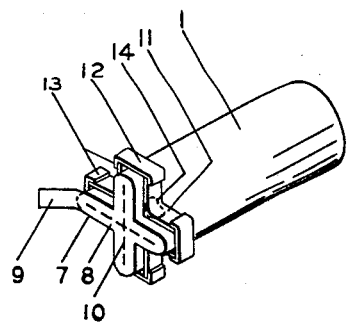
Figure 11:
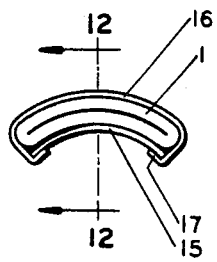
Figure 13:
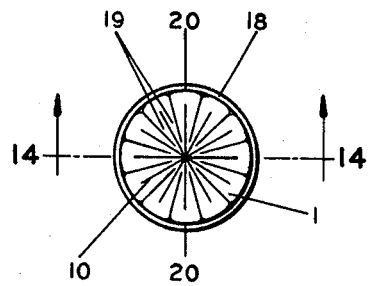
Figure 12:
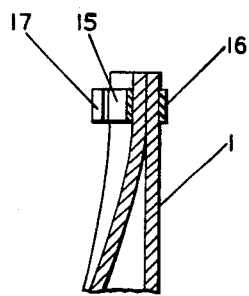
Figure 14:
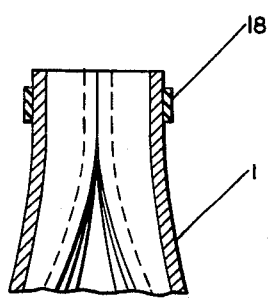
Figure 15:
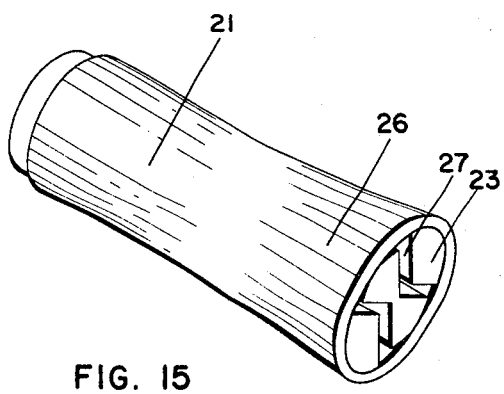
Figure 16:
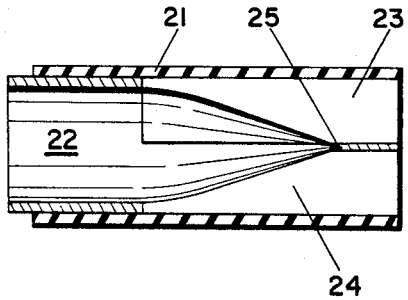
Figure 17:
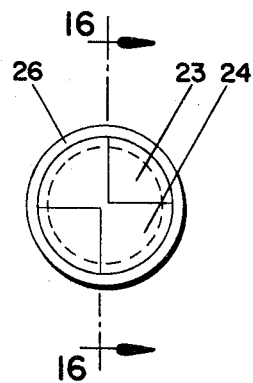

FIGURE 6, showing a modified form of the arrangement in FIGURE 4, illustrates in perspective another embodiment of the invention;

FIGURE 7 is a central longitudinal section, to an enlarged scale, of the egress end of the closure shown in FIGURE 6;

FIGURE 8 is a front elevation of the closure shown in FIGURE 6;

FIGURE 9 is a perspective view of a sealing arrangement over the egress end of the closure shown in FIGURE 1;

FIGURE 10 is a perspective view showing still another of said closures embodied by this invention and a modified form of the aforementioned sealing arrangement;

FIGURE 11 is an enlarged view showing the effluent side of the egress end of a closure of the general character illustrated in FIGURE 6 and another form of the closing means embodied by the invention;

FIGURE 12 is a longitudinal section of the egress end taken along line 12—12 of FIGURE 11 and viewed in the direction of the arrows;

FIGURE 13 is an enlarged view showing the effluent side of the egress end of a closure of the general character illustrated in FIGURE 4 and still another form of the closing means embodied by the invention;

FIGURE 14 is a longitudinal section of the egress end taken along line 14—14 of FIGURE 13 and viewed in the direction of the arrows;

FIGURE 15 is a perspective view of an additional closure embodied by the invention and having a body of a different type from the aforementioned closures, which view shows the closure partly open as though fluid were being discharged therefrom;

FIGURE 16 is a longitudinal section of the closure of FIGURE 15 taken on line 16—16 of FIGURE 17 and viewed in the direction of the arrows, which line is perpendicularly offset through the center of the figure;

FIGURE 17 is a front elevation of the closure of FIGURE 15; and

Figure 18:
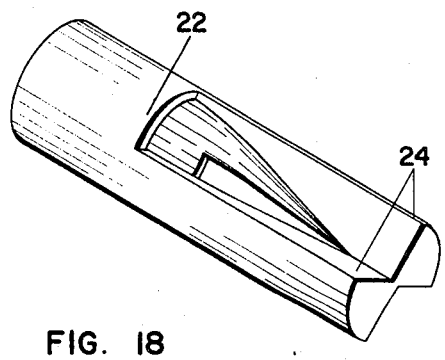

FIGURE 18 is a perspective view of the main supporting element or body of the closure of FIGURE 15, which view best shows the details of its shape in one illustration.

Similar parts are denoted by the same characters of reference throughout the specification and drawings.

Figure 2:
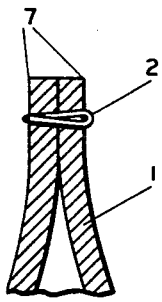
FIGURE 2 is a central longitudinal section, to an enlarged scale, of the egress end of the closure shown in FIGURE 1.
Figure 3:
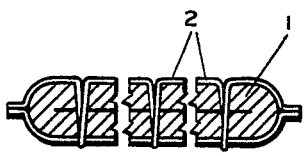
FIGURE 3 is an enlarged transverse section, with parts broken away, of the egress end of the closure shown in FIGURE 1.

Referring first to FIGURES 1 to 3, the closure body 1 is preferably constructed from a segment of thin wall flexible tubing, such as rubber, flexible plastic or the like. The egress end of the tubing 1 is flattened by pressing the opposite inner sides of the tubing wall together for a short interval of length immediately behind the actual end edge 7. Within this interval of length, the mated sides of the completely collapsed part of the tubing 1 are laced together with stitching 2 of an elastic thread. The stitching 2 preferably extends across the entire width of the egress end in parallel relation to the end edge 7 to maintain the tubing 1 in a collapsed and closed condition when efflux is not desired. When the pressure of the fluid or powder to be extruded is sufficiently increased, this pressure against the inside surface of the tubing 1 will cause the elastic stitching 2 to yield and permit egress of the contents. By adequately reducing the pressure of the contents still within the tubing 1, said stitching will recover and again bring the sides of the egress together.

The stitching 2 can be of any desired type using a thread size most suitable for the various conditions including stiffness of the egress wall, viscosity of the material to be ejected, spacing of the individual stitches, etc. It is of prime importance to have the spacing of the individual stitches close enough to effect a seal across the entire width of the egress end when not permitting discharge. It is also of great importance to provide sufficient tension in the individual stitches to assure automatic closing immediately after discharge. The ends of the threads where the stitching 2 terminates are preferably fused together to prevent the stitching from unravelling. The thread ends can also be fused or glued to the tubing 1 as a means for securing them.

Figure 5:
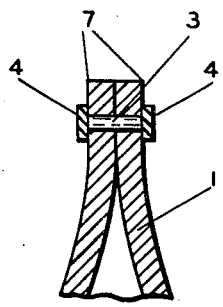
FIGURE 5 is an enlarged, central longitudinal section of the egress end of the closure shown in FIGURE 4.

FIGURES 4 and 5 illustrate another arrangement in which the egress end of the flexible tubing 1 is yieldably retained in a collapsed and closed condition by means of a casting made from a suitable elastic material. In this case, the tubing 1 has one or more spaced-apart perforations preferably aligned across the egress end a small distance from the actual end edge 7 and extending completely through both wall thicknesses of the mated sides.

The casting is in the form of one or more elastic filaments 3, preferably cylindrical, which pass through said respective perforations from one side of the egress end to the opposite side and have a single head 4 at their extremities in the form of a band, here shown having a rectangular section. In lieu of the band 4, the elastic filaments 3 can be headed in a variety of ways without deviating from the purpose of anchoring the ends of each filament with respect to the outside wall surfaces of the egress end of the tubing 1. Hence, said filaments can have a common head of any suitable volumetric shape on each side of the egress end of the tubing 1 or they can be individually headed.

In lieu of the various types of heads, the ends of the filaments 3 may be extended, lapped onto the exterior sides of the egress end and cemented or fused thereto; or they can be similarly anchored to the ribs 5, 5 of the embodiment shown in FIGURE 6 hereinafter described, which ribs may also serve as suitable heads. Like the aforementioned stitching, it is of prime importance to properly size and longitudinally prestress said filaments to assure closing immediately after discharge.

In the arrangement of FIGURES 6 to 8, the egress end of the flexible tubing 1 closes in arcuate abutment and the mated sides thereof are held united by being squeezed between two ribs 5, 5 at opposite sides of the egress end. The ribs 5, 5, here shown as two thin rigid strips of rectangular section bent concentric with respect to each other, are perforated along their major axes to provide passage for the spaced-apart elastic filaments 3, which link common heads 6,6 also at opposite sides of the egress end and are tensibly biased to urge said ribs inwardly. In the case of a thin pliant material being used for the body, the ribs are employed to give rigid backing to the wall between the filaments to help maintain closure of the egress end throughout the whole of its width when efflux is not desired. The ribs may be modified in many ways without departing from the scope of their purpose—to provide firm anchorage for the filament ends, to insure adequate stiffness of the egress wall between the filaments and to give desired shape to the aperture when the ribs are permitted to spread apart by elongation of the filaments. For example, the ribs 5,5 may be of any suitable cross-section and straight or bent to unite the opposite sides of the egress wall on any practicable line of closure.

FIGURE 10 depicts an embodiment of the invention which provides an unobstructed egress passage with closure on mutually perpendicular lines. The mated sides of the fully collapsed egress end of the tubing 1 are held united by being squeezed between four rigid ribs 11 linked by elastically elongatable ties 12 tensibly biased to urge said ribs inwardly. The ribs 11, here shown as right-angled strips of preferably rectangular section, are symmetrically arranged about the longitudinal axis of the tubing 1 and are secured from sliding with respect to same by adhesive attachment at the heel of each as indicated by dotted outline 14. The ties 12 are segments of a thin strip of elastic material, whose end portions 13 are secured to the respective ends of the ribs 11 by preferably cementing or fusing them together in lapped connection as shown. Sufficient pressure of the contents within the tubing 1 will cause the ties 12 to elongate so that the mated sides and the ribs 11 will spread apart to produce an aperture and efflux having a transverse section of cruciform shape. This arrangement further illustrates the use of ribs to give shape to the aperture and to cooperate in maintaining the mated sides of the egress end united when efflux is not desired.

FIGURES 11 and 12 illustrate a form of an elastically elongatable tie used when the mated sides of egress end close throughout their effective width in arcuate abutment without reverse curvature. The egress end of the tubing 1 is yieldably held in a closed condition by being squeezed between the rib 15 at the concave side thereof and the elastically elongatable band 16 tightly wrapped over the convex side thereof. The band 16 is a segment of a thin strip of elastic material, whose end portions 17 are secured to the respective ends of the ribs 15 by preferably cementing or fusing them together in lapped connection as shown. The rib 15 is here depicted as a thin rigid strip shaped as a segment of a circle with the abutting surfaces of the middle third of the span thereof and the egress end preferably cemented together to prevent sliding movement therebetween.

FIGURES 13 and 14 show an arrangement where the egress end of the tubing 1 is gathered into radial folds and yieldably constrained to a closed condition by the elastically elongatable band 18. In this case, the walls 19 of the mated sides of the egress end are shown preferably radially and evenly tapered from maximum thickness at the band 18 to zero thickness at the longitudinal axis of the egress end to bring about closure on radial loci 10. The abutting surfaces 20 of the band 18 and any two, outer, diametrically opposite return bends of the folds are, by preference, cemented together to prevent slippage of the band 18 along the egress end. A thin film of a suitable lubricant, such as a paraffin-based grease, is also preferably placed between the remaining abutting surfaces of the band and the return bends of the folds to reduce frictional resistance to motion therebetween.

In most cases it is optionally desirable to use a tapered or bell-shaped flexible tubular body 1, having the larger end collapsed to a closed condition and employed as the egress end, to obtain an approximately uniform overall width along the entire body length. The body 1 may also be premolded as in its closed condition and appropriately slit to create an egress passage.

The closure depicted in FIGURES 15 through 18 is fashioned from basically two parts: an elastic sleeve 21 and a rigid or semi-rigid cylindrical body 22 having complementary movable walls 23. The ingress end and transition section of the body are tubular with the bore thereof tapered for the full length of the transition section to an apex 25 at its downstream extremity. The movable walls are diametrically opposed sectors severed from the transition section and solid egress end, thus leaving the main supporting element shown in FIGURE 18. Surrounding the body 22 and its movable walls 23 in their assembled condition is the elastic sleeve 21 which is biased to urge the walls radially inward to their seated condition for bringing about and yieldably maintaining closure. The abutting surfaces of the sleeve and the movable walls, and also the sleeve and the ingress end of the body 22, are bonded together to prevent slippage therebetween.

This arrangement provides an efficient yieldable outlet whose movable walls 23 are peripherally linked by elastically elongatable vincula 26 tightly wrapped around the remaining sectors 24 of the body 22. These vincula bind together and yieldably maintain the mated sides of the movable walls 23 and the sectors 24 united along their effective width for closure.

This closure also operates on the same principle as the other closures herein presented. When the pressure of the fluid against the inner converging surfaces of the movable walls is sufficiently increased, the vincula 26 peripherally elongate and thereby allow the movable walls to spread apart for egress through the passageways 27. Upon reduction of this pressure the vincula elastically shorten to bring about closure.

The thread of the stitching 2, the filaments 3 and their respective heads 4 and 6, the ties 12, the bands 16 and 18, and the sleeve 21 are made of rubber or any other suitable material having adequate elasticity. The ribs 5, 11 and 15, and the body 22 including the movable walls 23 are made of rigid metal or rigid plastic but other suitable materials can be used for this purpose.

It will be appreciated that any of the arrangements and elements herein described may, when it is possible, be employed in combination with each other; for example, the ribs 5, 5 shown in FIGURES 6 to 8 may be employed in the embodiments shown in FIGURES 1 to 3 and FIGURES 4 and 5. Moreover, the rib 5 at the convex side of the egress end, shown in FIGURES 6 to 8, is preferably eliminated when the sides of the egress end close in transverse arcuate abutment as illustrated. In this case, it can be obviously realized that a filament 3 is required at each of the side extremities of the abutting surfaces of the mated sides to effect closure throughout the whole of the width of the egress end.

It will also be appreciated that the closures herein described have many applications and will therefore be connected to a variety of collapsible tubes, containers, reservoirs, conduits, etc. The connection of each can be made by any of many conventional means; for example, the influent end of each of the closures herein described having a flexible body can be slipped over the end of a short tubular outlet of the reservoir or container, and held in place by friction, an adhesive substance, or a suitable clamp. Moreover, such a closure body can be an integral portion of a relatively long flexible conduit or collapsible tube of a unitary and continuous material. The influent end of the closure body 22 can be internally threaded and screwed onto a threaded tubular outlet of the reservoir or container.

In some cases it will be desirable to provide a disposable seal to be removed by the user. FIGURES 9 and 10 each show a seal comprising a covering strip 8 made of a thin pliable material, such as paper, plastic impregnated cloth, or the like, and adaptable to any of the closures herein described. The covering strip 8 is secured to the egress end by non-solidifying adhesive attachment surrounding the locus-of-closure 10 at the front of the egress end. A portion 9 of each covering strip 8 is left free of adhesive to serve as a pull for removal of the seal. In FIGURE 9 the strip 8 is shown doubled about one of its axes over the egress end of the closure depicted in FIGURES 1 to 3, and in FIGURE 10 the strip 8 is shown cut to the dimensions outlined by end edge 7 of that particular arrangement.

Thus, among others, the several objects of the invention, as specifically aforenoted, are achieved. Obviously, numerous changes in construction and rearrangement of parts providing other embodiments might be resorted to without departing from the scope and spirit of the invention as defined by the claims.

Since a tubular body may be a single enclosing element, as herein disclosed, it is to be understood that the term "wall" is also intended to means that portion of the body which belongs to a side or boundary element of the egress aperture.

It is also to be understood that the following claims are intended to cover all of the generic and specific features of the invention herein described, and all statements of the scope of the invention which, as a matter of language, might be said to fall therewithin.

Having described my invention, what I claim is new and desire to secure by Letters Patent is:

1. An automatic valvular closure comprising at least: a flexible tubular body collapsed to a closed condition at its egress end; and at least one elastically elongatable filament adapted to yieldably maintain the mated sides of said egress end united throughout their effective width, said filament passing through the mated sides united thereby and having the respective ends thereof anchored to opposite sides of said egress end; whereby said egress end opens and said filament elongatingly yields, when pressure is exerted against the interior surface of said body by the contents therewithin, to give egress to said contents and said end is closed again by at least said filament when said pressure is reduced.

2. An automatic valvular closure comprising at least: a flexible tubular body collapsed to a closed condition at its egress end; and elastic stitching adapted to yieldably maintain the mated sides of said egress end united throughout their effective width, said stitching passing through said mated sides; whereby said egress end opens and said stitching yields, when pressure is exerted against the interior surface of said body by the contents therewithin, to give egress to said contents and said end is closed again by said stitching when said pressure is reduced.

3. In an automatic valvular closure having an egress wall collapsible to a closed condition with a second egress wall; at least one elastically elongatable tie lacing said egress walls together and adapted to yieldably maintain the mated sides of said egress walls united along their effective width; whereby said tie elongatingly yields when the first-mentioned egress wall opens, and said tie elastically shortens when the first-mentioned egress wall closes.

References Cited

UNITED STATES PATENTS

| | | | |
|---|---|---|---|
| 156,908 | 11/1874 | Brock | 137—525.1 |
| 512,832 | 1/1894 | Layden | 137—525.1 X |
| 1,281,974 | 10/1918 | Kaeding | 137—525.1 X |
| 2,064,695 | 12/1936 | Sipe | 137—525.1 |
| 2,139,575 | 12/1938 | Crane | 222—490 X |
| 2,283,835 | 5/1942 | Weaver | 137—525.1 |
| 2,285,227 | 6/1942 | Pernu | 222—491 |
| 2,352,227 | 7/1944 | Langdon | 137—525.1 |
| 2,446,571 | 8/1948 | Browne | 137—525.1 |
| 2,494,653 | 1/1950 | Geffroy | 137—525.1 |
| 2,753,091 | 7/1956 | Herzig | 222—491 |
| 2,815,150 | 12/1957 | Herzig | 222—491 X |
| 2,926,692 | 1/1960 | Zillman | 137—525.1 X |

FOREIGN PATENTS 722,969  10/1955  Great Britain.

WILLIAM F. O'DEA, *Primary Examiner.*

HOWARD COHN, *Assistant Examiner.*